Jan. 17, 1928.
M. COSTELLO
1,656,266
PNEUMATIC SHOCK ABSORBER
Filed March 5, 1926
2 Sheets-Sheet 1
Fig.1,
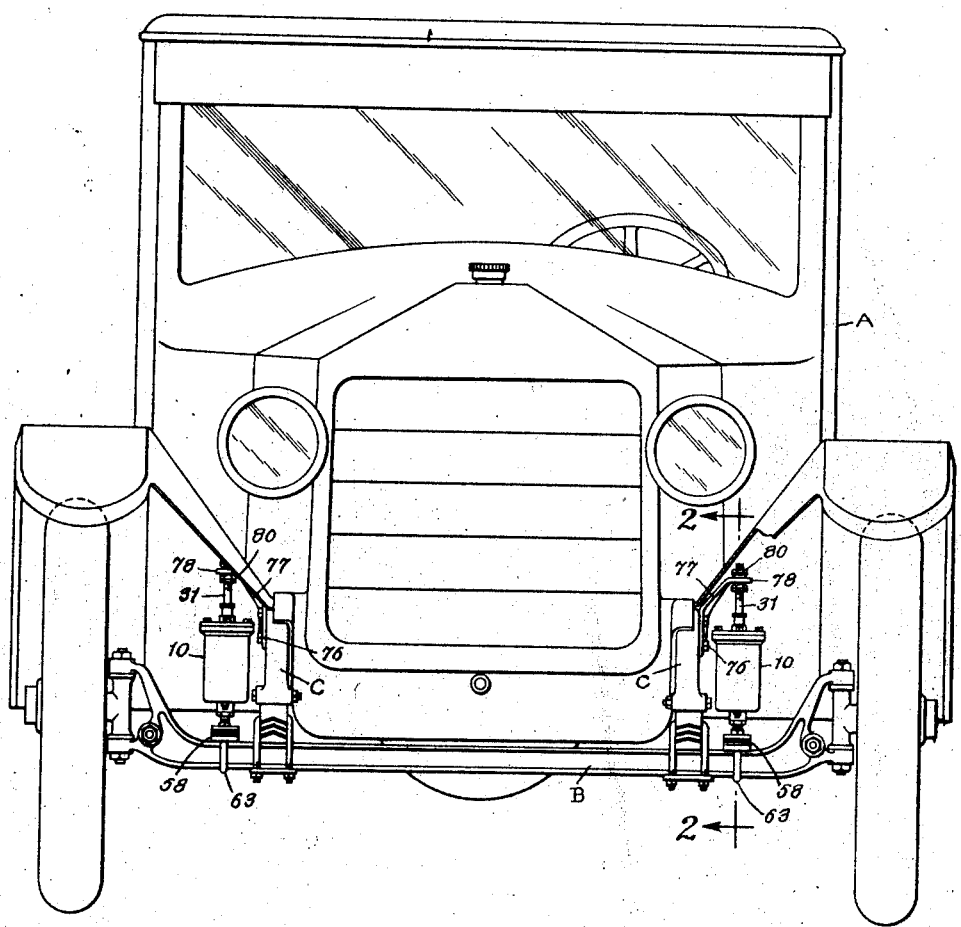
INVENTOR
Michael Costello
BY
W. T. Criswell
ATTORNEY

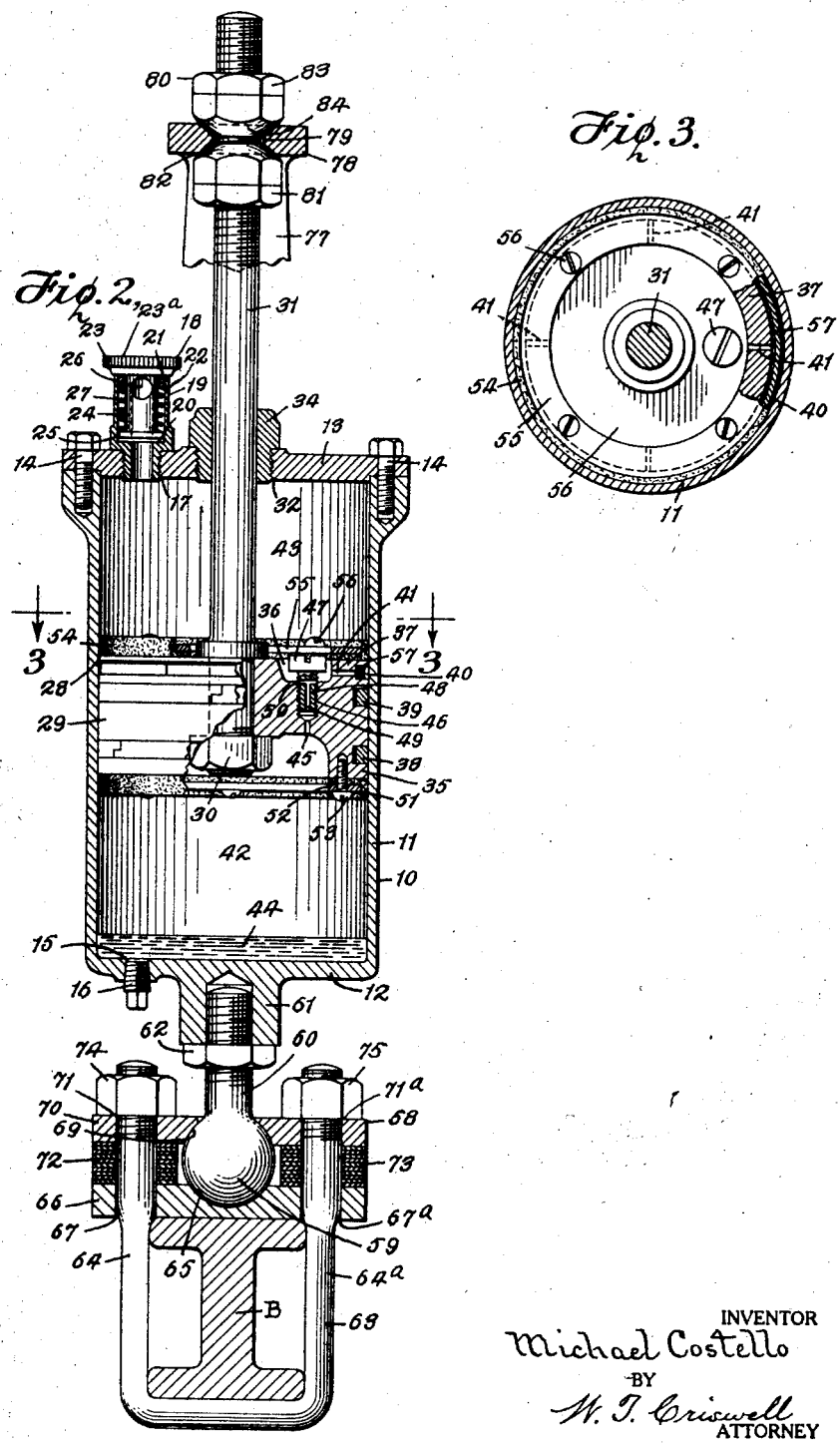

Patented Jan. 17, 1928.

1,656,266

UNITED STATES PATENT OFFICE.

MICHAEL COSTELLO, OF JERSEY CITY, NEW JERSEY.

PNEUMATIC SHOCK ABSORBER.

Application filed March 5, 1926. Serial No. 92,472.

This invention relates more particularly to a class of cushioning devices for vehicles.

My invention has for its object primarily to provide a shock absorber designed to be employed on automobiles, auto trucks and other vehicles for cushioning the body of each to provide comfort for the occupants when the vehicle is travelling by absorbing the impacts from jolts caused by the wheels contacting with obstacles and running into ruts or other uneven parts of highways, and which is of a form for being preferably mounted on the axles and chassis of the vehicles in a manner whereby the device will be retained in effective operative position should the axles or body of the vehicle assume inclinations owing to irregular surfaces of the highways; thus, overcoming the objections to the use of such classes of devices in conjunction with the springs of vehicles.

The invention consists essentially of a cylinder having closed lower and upper ends, and in the upper end of the cylinder is a port for admitting and discharging air. In the cylinder is a reciprocatory piston having a rod which is reciprocable through an opening in the upper end of the cylinder. The part of the interior of the cylinder above the piston serves as an upper air chamber and the part of the interior of the cylinder below the piston serves as a lower chamber. The piston during its reciprocatory upward and downward strokes is thereby effectually cushioned by compressing the air in these chambers, and in the lower chamber may also be provided an oil lubricant. In the outer periphery of the piston may be an annular groove, and the piston has means providing a regulated restricted passage for admitting a given volume of air from the upper chamber into the lower chamber with the upward strokes of the piston and for discharging a given volume of air from the lower chamber with the downward strokes of the piston. The suctional action of the piston during its upstrokes will also cause portions of the lubricant to be converted into spray, and with the down-strokes of the piston the spray of oil will flow with the discharged air through the restricted passage of the piston into its annular groove for lubricating the piston. On the lower end of the cylinder is means for adjustably connecting the cylinder to an axle of the vehicle so that the cylinder will be maintained in operative upright position irrespective of the inclination of the axle, and on the piston rod is means for adjustably connecting the rod to the chassis of the vehicle for maintaining the rod in operative vertical position irrespective of the inclination of the chassis. The device will thereby effectually operate for cushioning the body of the vehicle against shocks in whatever positions the axles and chassis may assume.

A further object of the invention is to provide a shock absorber of a simple, efficient and durable construction which may be made in appropriate sizes and shapes.

With these and other objects in view, the invention will be hereinafter more fully described with reference to the accompanying drawing forming a part of this specification in which similar characters of reference indicate corresponding parts in all the view, and will then be pointed out in the claims at the end of the description.

In the drawings, Figure 1 is a front elevation of an automobile showing the preferred manner of employing my improved shock absorber in conjunction therewith.

Fig. 2 is an enlarged detail sectional view, partly broken away, taken on the line 2—2 of Fig. 1, and Fig. 3 is an enlarged sectional view, partly broken away, taken on the line 3—3 of Fig. 2.

The device or shock absorber has a cylinder 10 which may be of any suitable size and shape, though the form of the cylinder illustrated has a circular side wall 11, and integral lower end wall 12, and the upper end of the side wall is closed by a removable cover plate 13 which may be bolted, as at 14, or otherwise detachably fastened to the side wall. In the lower end wall 12 is a threaded outlet 15 in which is screwed a threaded plug 16 for opening and closing the outlet. In the cover plate 13 of the cylinder is a threaded port 17 in which is an oil cup 18 which permits the admission and discharge of air into and from the interior of the cylinder.

The member 18 has a tubular casing 19 having an exteriorly threaded lower end which is reduced in diameter to provide in the lower part of the interior of the casing an annular shoulder, as 20. In the upper end of the casing 19 is sweted or welded a ring, as 21, to provide a shoulder 22. In the casing 20 is a valve 23 which includes a cap 23ª having on its underside a tubular extension or stem 24 which is slidably disposed in the upper end of the casing. The tubular stem 24 of the cap is of a length so that its lower end terminates in proximity to the shoulder 20 of the casing, and surrounding the lower end of the tubular stem is an annular flange 25. The passage of the stem 24 leads into the passage of the lower threaded reduced end of the tubular casing 19, and in the stem 24 adjacent the cap 23ª is an orifice 26 which leads into the passage of the stem. Surrounding the stem 24 between the shoulder 22 of the ring 21 of casing and the annular flange 25 of the stem is a spring, as 27, which is tensioned for normally forcing the flange 25 and stem 24 yieldingly inward of the casing to hold the valve 23 removably seated on the casing 19. The spring 27 is tensioned for allowing the valve 23 and its tubular stem 24 to be raised a determined distance outwardly of the casing 19 for alternately permitting air to flow into the cylinder 10 and to discharge air from the cylinder, as will be later explained.

Reciprocable in the cylinder 10 is a piston 28 having a body part or head 29, and in an opening in the center of the head 29 is held, at 30, the lower end of a rod 31 which is reciprocable through a threaded opening 32 in the upper end wall or plate 13 of the cylinder. The rod is made movably air-tight in the opening 32 by a threaded packing or gasket, as 34, which is screwed, as shown, in the threaded opening, and the rod may be of a length so that its upper end terminates some distance above the cylinder. The central part of the underside of the head 29 of the piston 28 may be recessed to provide a downwardly extending annular wall, as 35, and in the central portion of the upper face of the head 29 is a well 36 which surrounds the rod 31 to provide an upwardly protruding annular wall 37. In spaced annular grooves in the outer periphery of the piston head 29 are suitable packing rings, as 38, 39, and in the outer periphery of the annular wall 37 of the head is an annular groove 40 which is on a longitudinal plane corresponding nearly to the plane of the bottom of the well 36. In spaced parts of the wall 37 of the well 36 are a number of ducts or passages 41 all leading from the well 36 into the groove 40. The piston 28 provides a chamber 42 in the lower part of the cylinder and provides a chamber 43 in the upper part of the cylinder. In the lower chamber 42 may also be provided a quantity of lubricating oil, as 44. In the head 29 of the piston in proximity to one of the ducts 41 is a restricted passage 45 which leads from the well 36 to the recess in the underside of the head. The upper portion of the passage 45 is enlarged in diameter, as at 46, to provide a socket which communicates with the passage, and the wall of the socket 46 is threaded. In the threaded socket 46 is screwed a threaded bolt or screw, as 47, and in the shank or stem of the screw is a duct or passage 48 preferably of a T-shape to provide a branch 49 and a cross-branch 50. The branch 49 of the passage 48 communicates with the restricted passage 45 of the head, and the branch 50 of the passage 48 of the regulating screw 47 leads into the well 36 with one of its ends normally in proximity to one of the ducts 41. On the lower edge of the annular wall 35 of the head 29 of the piston may be a packing ring, as 51, of leather or other yielding material, and this packing ring may be formed into substantially an L-shape in cross-section by means of a metal ring, as 52, which is fastened to the head 29 of the piston by bolts or screws 53, the ring 52 being of less diameter than the head of the piston serves to cause the packing 51 to assume its L-shape when the metal ring 52 is secured to the head of the piston. On the upper edge of the wall 35 of the well 36 of the head 29 of the piston may be another packing ring 54 of leather or other yielding material, and this packing ring 54 may also be of substantially an L-shape in cross-section. A metal ring, as 55, of less diameter than the piston head is arranged on the inner edge portion of the packing ring 54, and by fastening the ring 55 and packing ring 54 by means of bolts or screws 56 to the head 29 of the piston the packing is formed into its L-shape. The yielding packings 51 and 54 thus formed provide air-tight reciprocatory engagements between the piston and the wall of the cylinder.

With the upstrokes of the rod 31 and the piston 28 the member 23 will be raised outwardly of the casing 19 against the tension of the spring 27 for permitting air to be discharged from the upper chamber 43 of the cylinder through the opening 26 and through the passage of the stem 24. With the downstrokes of the piston air will be admitted into the opening 26 and through the passage of the stem 24 of the member 23 into the upper chamber. The oil cup 18 described above is of the well known commercial type and it will be understood that sufficient air will be admitted due to the more or less loose fit of the cap 13ª, upon the down-stroke of the piston. The air will also flow through the passage 48 of the regulating screw 47 and through the passage 45 of the piston head 29 into the lower chamber 42 of the cylinder. The valve 23 and the adjusting screw 27 of the piston are so regulated that sufficient air will be retained in the chambers 42 and 43 for being compressed to effectually cushion the piston during its upstrokes and downstrokes. Moreover, the suctional action of the piston during its reciprocatory movements will cause conversion of the oil lubricant into the form of spray, and with the downstrokes of the piston the spray of oil will flow with the air through the passage 45 of the piston head and through the passage 48 of the screw 47 into the well 36 of the piston. The pressure of the air in the upper chamber 43 will force the lubricant through the ducts 41 into the annular groove 40 of the piston head for keeping the piston properly lubricated, and to limit the supply of the lubricant delivered into the groove 40. In this groove is loosely disposed a metal ring 57 which is of a size to only partly fill the groove. The excess of the lubricant which may collect in the well 36 of the piston from time to time will be partly or entirely forced through the passage 48 of the screw 47 and through the passage 45 of the piston head into the lower chamber 42 of the cylinder. The chamber 42 may be emptied of the lubricant or the chamber may be replenished with lubricant as occasion requires through outlet 15 in the bottom of the cylinder after removal of the plug 16.

In practice I prefer to apply two of the devices on the front of an automobile, as A, or other vehicle and two of the devices are employed on the rear of the vehicle. The lower end of each of the devices is adjustably mounted on an axle, as B, of the vehicle, and the piston rod 31 is adjustably mounted to the chassis, as C, of the vehicle. The lower end of the cylinder 10 of each device is detachably mounted on the axle B by means of a universal joint, as 58, which includes a ball or spherical head 59 having a threaded stem 60 which is screwed in a threaded boss 61 that depends from the underside of the bottom wall 12 of the cylinder 10, and the stem 60 of the ball 59 is removably secured in the boss 61 by a nut, as 62, being rotated into engagement with the boss. A substantially U-shaped bar or strap, as 63, is arranged to straddle the axle B so that the arms 64, 64ᵃ of the strap are disposed upwardly on the sides of the axle, and the free end parts of these arms are threaded. The arms 64, 64ᵃ of the strap 63 are of lengths as well as being spaced from each other so that they extend in spaced relation to opposite parts of the ball 59 and so that they extend above the ball. The lower part of the ball 59 is revolvably seated in the concavity, as 65, in the upper face of a bearing plate 66 having spaced orifices 67, 67ᵃ through which protrude the arms 64, 64ᵃ of the strap 63. The upper part of the ball 59 is revolvably seated in the concaved end, as 68, of the aperture 69 of another bearing plate 70. The stem 60 of the ball 59 extends through the aperture 69 of the bearing plate 70, and in spaced parts of this bearing plate are orifices 71, 71ᵃ through which the upper ends of the arms 64, 64ᵃ of the strap protrude. On the arm 64 of the strap 63 between the bearing plate 66 and 70 may be a number of orificed shim plates 72, and on the arm 64ᵃ of the strap 63 between the bearing plates 66 and 70 may also be a number of orificed shim plates 73. The shim plates of each group are of sufficient number to space the bearing plates 66 and 70 suitable distances for providing a snug easeful bearing for the ball 59, and for also enabling other shim plates to be added to the groups or for allowing a number of the plates to be removed from the groups to readjust the bearing plates when the ball or plates wear by frictional action. The strap 63 is detachably fastened to the axle B and to the bearing plates 66 and 70 by nuts 74, 75 which are screwed on the threaded ends of the arms 64, 64ᵃ of the strap 63 into engagements with the bearing plate 70 for clamping this bearing plate with the shim plates and the bearing plate 66 to the axle 70.

The device is detachably mounted on the chassis C of the vehicle by bolting, as 76, or otherwise securing the lower end of a bracket or bar, as 77, to a part of the chassis above the axle B of the vehicle. The bar 77 is bent laterally from the chassis on an incline so that its upper end is on a vertical line above the universal joint 58, and the upper end of the bar is bent, as at 78, on a longitudinal plane with respect to the inclined portion of the bar. In the bent end 78 of the bar 77 is an opening 79 through which the upper end of the piston rod 31 is disposed, and this opening is somewhat larger than the diameter of the piston rod. As shown, the upper and lower parts of the edge of the opening 79 are beveled to form a bearing of the bent end 78 of the bar 77 and this bearing provides part of a universal joint 80 which connects the piston rod to the bar or bracket 77. The upper end portion of the piston rod 31 is threaded. On this threaded portion of the piston under the bearing 78 of the bar 77 is screwed a nut 81 having its upper end formed in substantially a semi-spherical shape, as at 82, and this semi-spherical part of the nut 81 is movably seated in the lower beveled part of the edge of the opening 79 of the bearing or bent end 78 of the bracket bar 77. Also on the threaded portion of the piston rod 31 above the bearing 78 of the bar 77 is another nut 83 having its lower end formed in approximately a semi-spherical shape, as at 84, and this semi-spherical part of the nut 83 is movably seated in the upper beveled part of the edge of the opening 79 of the bearing 78 of the bracket 77. The universal joint 80 thus provided enables the chassis and body of the vehicle to assume various inclinations during the travel of the vehicle without altering the normal operative vertical position of the piston rod 31, and by employing the universal joint 58, as above described, enables the axle of the vehicle to assume various inclinations without changing the normal operative upright position of the cylinder 10 of the device. Moreover, by using a number of the devices separately of the springs of the vehicle the impacts of jolts of the vehicle will be effectively absorbed by each device, operating, as above described, for giving comfort to the occupants when the vehicle is travelling.

In the foregoing description, I have embodied the preferred form of my invention, but I do not wish to be understood as limiting myself thereto, as I am aware that modifications may be made therein without departing from the principle or sacrificing any of the advantages of this invention, therefore, I reesrve to myself the right to make such changes as fairly fall within the scope thereof.

Having thus described my invention, I claim as new and desire to secure by Letters Patent:—

1. A pneumatic shock absorber, comprising a cylinder having closed lower and upper ends, means in the upper end of the cylinder for admitting and discharging air, a piston in the cylinder providing upper and lower air chambers and having a rod reciprocable through an opening in the upper end of the cylinder, the lower chamber adapted to hold an oil lubricant, said piston having in its upper face a well surrounding the rod and providing an annular wall at the outer periphery of the piston, the wall of the well having in its outer periphery an annular groove and also spaced ducts leading from the well into said annular groove, a yielding packing on the lower end at the outer peripheral edge of the piston, a second yielding packing on the wall at the outer peripheral edge of the well of the piston, means providing a regulated restricted passage in the piston for admitting air from the upper chamber to the lower chamber of the cylinder with the upward strokes of the piston and for discharging air from the lower chamber with the downward strokes of the piston, and for admitting from the lower chamber into said annular groove of the piston the lubricant in spray form caused by the suctional action in the lower chamber of the piston, a ring in the annular groove of the piston for limiting the volume of lubricant content in the groove, a universal joint for adjustably connecting the lower end of the cylinder to an axle of a vehicle for maintaining the cylinder in operative upright position irrespective of the inclination of the axle, and a second universal joint for adjustably connecting the free end portion of the piston rod to the chassis of a vehicle for maintaining the rod in operative vertical position irrespective of the inclination of the chassis.

2. A pneumatic shock absorber, comprising a cylinder, a piston on the cylinder, a rod attached to said piston and reciprocable therewith, said piston having in its uppers face a well surrounding the rod and providing an annular wall at the outer periphery of the piston, the wall of the well having in its outer periphery an annular groove and also spaced ducts leading from the well into said annular groove, a packing carried by said piston, and an adjustable member carried by said piston, said member being provided with a T shaped duct permitting air to flow from one side of said piston to the other, one end of said T shaped duct lying within said well.

3. A pneumatic shock absorber, comprising a cylinder, a piston on the cylinder, a rod attached to said piston and reciprocable therewith, said piston having in its upper face a well surrounding the rod and providing an annular wall at the outer periphery of the piston, the wall of the well having in its outer periphery an annular groove and also spaced ducts leading from the well into said annular groove, and a screw member carried by said piston, said screw member being provided with a T shaped duct communicating between said well and the opposite side of said piston.

This specification signed and witnessed this 4th day of March A. D. 1926.

MICHAEL COSTELLO.